Sept. 22, 1959 F. GALAVICS 2,905,388
CONTROL APPARATUS FOR CONTROLLING HEATING SYSTEMS
IN DEPENDENCE ON AMBIENT ATMOSPHERIC CONDITIONS
Original Filed Nov. 27, 1951

Inventor
Franz Galavics
by
Morgan, Finnegan and Durham
Attorneys 2,905,388
Patented Sept. 22, 1959

2,905,388

CONTROL APPARATUS FOR CONTROLLING HEATING SYSTEMS IN DEPENDENCE ON AMBIENT ATMOSPHERIC CONDITIONS

Franz Galavics, Zurich, Switzerland, assignor to Landis & Gyr, A.G., a body corporate of Switzerland Original application November 27, 1951, Serial No. 258,389, now Patent No. 2,804,269, dated August 27, 1957. Divided and this application March 8, 1957, Serial No. 646,510

Claims priority, application Switzerland November 29, 1950

8 Claims. (Cl. 236—91)

This invention relates to a novel control apparatus for heating systems adapted to be used in conjunction with a heating regulator for maintaining the room temperature of a building constant regardless of the outside temperature.

This application is a division of applicant's copending application Serial No. 258,389, filed November 27, 1951, now issued as Patent No. 2,804,269.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

An object of the present invention is to provide a novel control apparatus for heating systems adapted to be used in combination with a heating regulator to maintain constant temperature in a room in a highly efficient manner.

A further object of the present invention is to provide a novel control apparatus for heating systems which when subjected to changes in weather conditions is adapted to cooperate with a heating regulator to provide the necessary increase or decrease of heat necessary to maintain a room at a predetermined fixed temperature.

Another object of my invention is to provide a novel control apparatus for heating systems which is simple in design and cheap to produce.

The accompanying drawings, referred to herein and constituting a part hereof, illustrate embodiments of the invention, and together with the description, serve to explain the principles of the invention.

In order to maintain a room at a constant temperature, a heating system is necessary to replace heat which is lost from the room to the outside air. Obviously, the greater the heat loss, the greater will be the amount of heat required to be supplied which in turn increases the operating expenses.

Apparatus has previously been designed for maintaining a constant temperature in a room by providing a heating system comprising a chamber in which there is a control apparatus which intermittently connects and disconnects an electric auxiliary heating apparatus.

As the heating losses increase in the chamber or in the room, the period of time for which the auxiliary heating device must be kept connected by means of the temperature control in order to maintain the temperature of the chamber at the desired temperature is increased. The heating control of this type of equipment is regulated by the temperature regulation of the control apparatus by means of impulses, the duration of said impulses varying proportionately to the weather conditions. Although the type of apparatus just described is very useful, it is quite complicated on account of its impulse type control. On account of its elaborate construction, it is also quite expensive.

In order to provide a much simpler and less expensive heat-loss measuring device than previously known, I have invented a novel and most useful apparatus which is quite simple and yet highly efficient.

The present invention comprises a control apparatus for heating systems which is adapted to be used in combination with a heating regulator. The control apparatus comprises a chamber adapted to be exposed to the influence of the temperature of the outdoor elements, said chamber having contained therein a heating element and a thermoelement. The thermoelement is adapted to control a heating regulator, said heating regulator in turn supplying the necessary heat into the room to make up for the heat lost to the outdoors through the walls, windows, etc. of the room. The thermoelement is subjected to the outside temperature and is influenced by the heat coming from the heating element.

Figure 1:
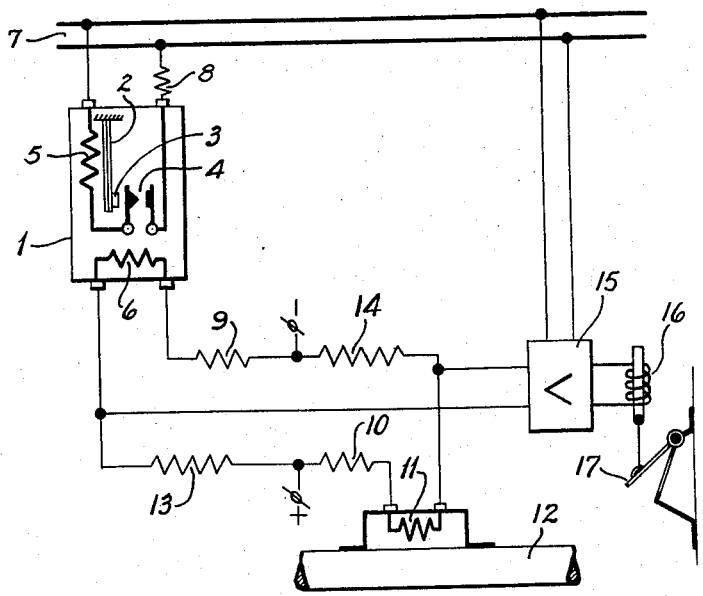
Fig. 1 is a diagrammatic view of one embodiment of the control apparatus for heating systems in combination with a heating regulator.

In order to describe the invention more specifically, reference is now made to the embodiment shown in Fig. 1. A chamber 1, adapted to be subjected to the outside elements, contains a bimetal 2 which controls the connection and disconnection of the terminals of contact 4 by means of insulating member 3. Also, in the chamber 1 is a resistance 5 which serves as a heating element both for the bimetal 2 and the thermoelement 6.

The resistance 5 is connected in series with contact 4 and a resistance 8 to the potential of a network 7. Series resistance 8, positioned outside the chamber 1, regulates the current intensity in the circuit of the resistance 5. Connected to the thermoelement 6 is a measuring bridge of a heating regulator consisting of resistances 9, 10, 13 and 14, the thermoelement 6 being connected in series with the bridge resistance 9 in a branch of the measuring bridge, with the opposite branch of said measuring bridge being provided with a contact thermostat 11. The thermostat 11 is designed as a resistance thermoelement and is connected in series with the bridge resistance 10. The contact thermoelement 11 is positioned on a hot-water flow-pipe 12 of a heating plant, not otherwise shown.

Completing the measuring bridge, are the bridge resistances 13 and 14, said bridge resistances 13 and 14 lying opposite to each other. The measuring bridge is fed by a source of bridge potential applied at the terminals $+\phi$ and $-\phi$, with the output of the bridge being connected to the input of an amplifier 15. Amplifier 15 controls a vertical magnet 16 for the control of a draft air flap 17 of a boiler, not otherwise shown.

As mentioned previously, the chamber 1 in use is exposed to the outside elements which include temperature of the air, force of wind, air humidity, sun radiation and heat radiation. The chamber, for example, may be attached to the outside wall of a building. Since the thermoelement is held in the chamber 1, it too is subject to the outside elements as well as subject to the heating effects of the resistance 5.

The control apparatus of the present invention cooperates with the heating regulator as in the following manner. First, the desired room temperature is determined, and the bimetal 2 is so adjusted that it actuates the contact 4 at said desired room temperature as, for example, 20° C. so that said contact 4 is closed only when the bimetal 2 falls short of this temperature and is opened when it exceeds said room temperature. In Fig. 1, the bimetal is shown in its hot or expanded condition so that when it cools it will return and actuate the contact 4.

When the terminals of contact 4 are connected, the resistance 5 is likewise connected, which means that current flows through said resistance producing heat, said resistance at the same time being subjected to outside weather conditions as the chamber is positioned outdoors. Likewise, when the terminals of contact 4 are disconnected, no current flows through the resistance. The connecting and disconnecting of the resistance depending on the temperature of the bimetal subjected to outside weather conditions, means that the mean output of heat by the resistance is made dependent on the weather conditions.

At the same time, there is produced in the resistance thermoelement, a heating effect varying with the influences of the weather. With each resistance value of the resistance thermoelement 6 there is associated a resistance value of the contact thermostat 11 in such a way that the measuring bridge is in equilibrium, which is to say that the output current of the bridge is zero, so that a definite temperature of the contact thermostat 11 is coordinated with every temperature of the resistance thermoelement 6. This coordination is of such a nature that a decreasing temperature of the resistance thermoelement 6 corresponds to an increasing temperature of the contact thermostat 11. The correct quantitative coordination of the two temperatures at which the hot water flow temperature is such that the heat supply to the heated rooms corresponds to the heat requirement at the corresponding outside and other weather conditions, is established by the selection of the bridge resistances 9, 10, 13 and 14.

Now, if the hot water flow temperature does not correspond to the outside temperature and the other weather conditions, the balance of the bridge is disturbed, and a control potential appears at the amplifier input, which potential, amplified by the amplifier 15, controls the vertical magnet 16 in such a manner that at too low a flow temperature the magnet opens the draft air flap 18 and vice versa, so that the desired regulation process is attained.

The measuring bridge of the heating regulator may be replaced by a differential or any other equivalent apparatus. Likewise, the control apparatus may serve not only to actuate the draft air flap, but also be used to control automatic switch devices, relays, electric blowers, relays for automatic oil furnaces, engine switching mechanisms, mixing valves, throttle flaps, engine valves, etc.

Other modifications than shown in Fig. 1 may be used to influence the thermoelement 6 by means of a heating effect changing with the weather conditions.

Figure 2:
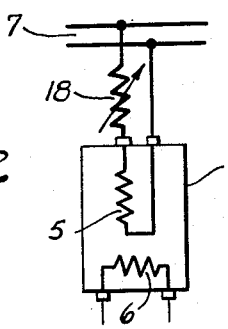
Figs. 2–4 are three additional embodiments of the control apparatus for heating systems.

In an embodiment shown in Fig. 2, the thermoelement 6 and resistance 5 are the only elements fixed in the chamber 1. A semi-conductor resistance is connected in series with resistance 5, said semi-conductor resistance 18 being positioned outside the chamber 1 and the resistance value of semi-conductor 18 decreasing greatly with decreasing temperature. Therefore, when the outside temperature drops, the resistance of semi-conductor 18 drops, which means that the current through semi-conductor 18 increases and the current passing through heating resistance 5 likewise increases so that said resistance 5 exerts the required heating effect on thermoelement 6.

Figure 3:
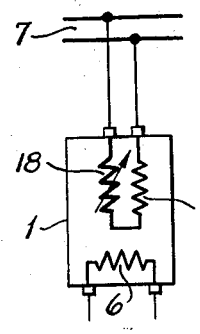

Fig. 3 is directed to another embodiment of the heat loss measuring apparatus in which the semi-conductor resistance 18 is positioned in the chamber 1.

Figure 4:
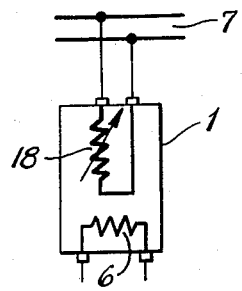

In Fig. 4 a still different modification is shown in which the semi-conductor resistance 18 is positioned in the chamber 1 and is connected so as to substitute for resistance 5 previously shown in the embodiment of Figs. 1–3. In other words, the need for a resistance is eliminated in the embodiment shown in Fig. 4, the semi-conductor resistance 18 providing the necessary heating effect.

By my novel apparatus as described previously and shown in different embodiments, it is possible to obtain control apparatus for heating systems which acts instantly with a heating regulator to maintain a constant room temperature. The instant said control apparatus is effected by a change in weather conditions, the heating regulator operates to decrease or increase the necessary heat to be supplied to the room in order to maintain a constant room temperature. Although the apparatus of my invention is relatively simple in construction, it is highly efficient and is a decided advance over anything known by me in the field.

The invention in its broader aspects is not limited to the specific mechanisms described but departures may be made therefrom within the scope of the accompanying claims without departing from the principles of the invention and without sacrificing its chief advantages.

I claim:

1. A control apparatus for heating systems adapted to be used in combination with a heating regulator having a control circuit whereby the room temperature of a building may be maintained constant, said control apparatus comprising a chamber exposed to the elements of the outside atmosphere, a temperature-responsive variable electrical element in the chamber for connection in the control circuit of the control regulator, and subjected to the influence of the outside atmosphere and a temperature sensing and electric heating means connected to the terminals of a commercial power network and adapted to direct heat at said electrical element in relation to the heat loss of the chamber to the atmosphere, the current flowing in said temperature sensing and heating means being independent of the electrical conditions of said control circuit and said temperature responsive variable electrical element.

2. A control apparatus for heating systems adapted to be used in combination with a heating regulator having a control circuit whereby the room temperature of a building may be maintained constant, said control apparatus comprising a chamber exposed to the elements of the outside atmosphere, a combination of heating means and temperature sensing means for maintaining a given point in the chamber substantially at a particular temperature, said combination being connected to the terminals of a commercial power network, the current flowing in said combination being independent of said control circuit, and a temperature-responsive variable electrical resistance in the chamber connected in the control circuit of the heating regulator and subject to the influence of said heating means and to the influence of the outside atmosphere whereby its electrical resistance is varied in relation to the heat loss of the chamber to the atmosphere.

3. A control apparatus for heating systems adapted to be used in combination with a heating regulator having a control circuit whereby the room temperature of a building may be maintained constant, said control apparatus comprising a chamber exposed to the elements of the outside atmosphere, a temperature-responsive variable electrical resistance in the chamber connected in the control circuit of the heating regulator, and heating means the current of which is supplied from a power source via a temperature-responsive element, said element being electrically isolated from said control circuit, for maintaining a given point in the chamber at a particular temperature, the output of said heating means being related to the heat loss of the chamber to the atmosphere and being directed at the electrical resistance.

4. Control apparatus as set forth in claim 3 in which the temperature-responsive element of the heating means comprises a bimetal feeler.

5. A control apparatus for heating systems adapted to be used in combination with a heating regulator having a control circuit whereby the room temperature of a building may be maintained constant, said control apparatus comprising a chamber exposed to the elements of the outside atmosphere, a first temperature-responsive electrical resistance in the chamber for connection in the control circuit of the control regulator, subjected to the influence of the outside atmosphere and an electric heating means in the chamber directly supplied by an electric power source, the heating current being controlled independently of said control circuit by a second temperature-responsive electrical resistance, said heating means being adapted to direct heat at said first temperature-responsive electrical resistance in relation to the heat loss of the chamber to the atmosphere.

6. Control apparatus as claimed in claim 5 in which the electric heating means in the chamber is an electrical heating resistance, the heating current of which is controlled by a temperature-responsive electrical resistance exterior of the chamber, both resistances being fed by the electric power source.

7. Control apparatus as claimed in claim 5 in which the electric heating means in the chamber is an electrical heating resistance, the heating current of which is controlled by a temperature-responsive electrical resistance interior of the chamber, both resistances being fed by the electric power source.

8. Control apparatus as claimed in claim 2 in which said combination of heating and temperature sensing means is a temperature sensing and heat generating resistance.

References Cited in the file of this patent

UNITED STATES PATENTS

| | | |
|---|---|---|
| 2,137,059 | Moreau | Nov. 15, 1938 |
| 2,149,729 | Finch | Mar. 7, 1939 |
| 2,547,933 | Fitzgerald | Apr. 10, 1951 |
| 2,553,060 | Miner | May 15, 1951 |
| 2,564,416 | Wildhack | Aug. 14, 1951 |

FOREIGN PATENTS

| | | |
|---|---|---|
| 777,297 | France | Nov. 26, 1934 |